United States Patent
Wada et al.

(10) Patent No.: US 7,296,470 B2
(45) Date of Patent: Nov. 20, 2007

(54) EXTENDED ACCURACY FLEXURED PLATE DUAL CAPACITANCE ACCELEROMETER

(75) Inventors: Joan D. Wada, Anaheim, CA (US); Ray F. Campbell, Newport Beach, CA (US); Patricia S. Quan, Irvine, CA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 10/907,751

(22) Filed: Apr. 14, 2005

(65) Prior Publication Data

US 2007/0220974 A1   Sep. 27, 2007

(51) Int. Cl.
G01P 15/125 (2006.01)
G01C 19/00 (2006.01)

(52) U.S. Cl. ............................ 73/514.32; 701/1

(58) Field of Classification Search ............ 73/514.01, 73/514.32, 514.02, 510, 514.15, 514.18; 701/3, 1; 361/280, 283.3; 318/649
See application file for complete search history.

(56) References Cited

U.S. PATENT DOCUMENTS

| | | |
|---|---|---|
| 2,696,566 A | 12/1954 | Lion |
| 2,711,590 A | 6/1955 | Wilcox |
| 3,186,101 A | 6/1965 | Wolpert |
| 3,226,981 A | 1/1966 | Mullins et al. |
| 3,290,786 A | 12/1966 | Parkin |
| 3,417,626 A | 12/1968 | Riordan |
| 3,746,281 A | 7/1973 | Stripling |
| 4,470,562 A | 9/1984 | Hall et al. |
| 4,507,737 A | 3/1985 | LaSarge et al. |
| 4,583,296 A | 4/1986 | Dell'Acqua |
| 4,601,206 A | 7/1986 | Watson |
| 4,792,676 A | 12/1988 | Hojo et al. |
| 4,912,397 A | 3/1990 | Gale et al. |
| 4,987,779 A * | 1/1991 | McBrien ............ 73/514.18 |
| 5,008,774 A | 4/1991 | Bullis et al. |
| 5,031,330 A | 7/1991 | Stuart |
| 5,079,847 A | 1/1992 | Swartz et al. |
| 5,124,938 A | 6/1992 | Algrain |
| 5,146,417 A | 9/1992 | Watson |
| 5,180,986 A | 1/1993 | Swartz et al. |
| 5,191,713 A | 3/1993 | Alger et al. |
| 5,283,528 A | 2/1994 | van Seeters |
| 5,325,065 A * | 6/1994 | Bennett et al. ........... 324/661 |

(Continued)

FOREIGN PATENT DOCUMENTS

| | | |
|---|---|---|
| EP | 585862 A1 | 3/1994 |
| JP | 06082469 A | 3/1994 |

*Primary Examiner*—Helen Kwok
(74) *Attorney, Agent, or Firm*—Ostrager Chong Flaherty & Broitman P.C.

(57) ABSTRACT

A flexure plate accelerometer system includes a flexure plate and two fixed plates on either side of the flexure plate. The flexure plate generates a flexure plate signal as a function of reference signals received in the fixed plates. A precision transformer generates the reference signals from a precision sine wave generated by a symbol generator controlled by a microprocessor. The microprocessor controls the symbol generator and activates an analog-to-digital converter in response to a signal coincident with a positive and negative peak of the precision sine wave. The analog-to-digital converter generates a digital word from the flexure plate signal, which is processed further in the microprocessor.

25 Claims, 2 Drawing Sheets

U.S. PATENT DOCUMENTS

| | | |
|---|---|---|
| 5,383,363 A | 1/1995 | Kulmaczewski |
| 5,415,040 A | 5/1995 | Nottmeyer |
| 5,454,266 A * | 10/1995 | Chevroulet et al. ...... 73/514.18 |
| 5,456,111 A | 10/1995 | Hulsing, II |
| 5,461,319 A | 10/1995 | Peters |
| 5,495,414 A | 2/1996 | Spangler et al. |
| 5,597,956 A | 1/1997 | Ito et al. |
| 5,774,996 A | 7/1998 | Ogawa et al. |
| 5,801,309 A | 9/1998 | Carr et al. |
| 5,801,313 A | 9/1998 | Horibata et al. |
| 5,831,164 A | 11/1998 | Reddi et al. |
| 5,861,754 A | 1/1999 | Ueno et al. |
| 5,905,203 A | 5/1999 | Flach et al. |
| 5,969,250 A | 10/1999 | Greiff |
| 5,986,497 A | 11/1999 | Tsugai |
| 6,128,955 A | 10/2000 | Mimura |
| 6,230,566 B1 | 5/2001 | Lee et al. |
| 6,293,148 B1 | 9/2001 | Wang et al. |
| 6,338,199 B1 | 1/2002 | Chigira et al. |
| 6,449,857 B1 | 9/2002 | Anikolenko |
| 6,467,346 B1 | 10/2002 | Challoner et al. |
| 6,609,037 B1 | 8/2003 | Bless et al. |
| 6,622,647 B2 | 9/2003 | DePoy |
| 6,662,654 B2 | 12/2003 | Miao et al. |
| 6,688,013 B2 | 2/2004 | Greway |
| 6,701,788 B2 | 3/2004 | Babala |
| 6,731,121 B1 | 5/2004 | Hsu et al. |
| 6,776,043 B1 | 8/2004 | Campbell et al. |
| 6,785,975 B1 | 9/2004 | Campbell et al. |
| 6,810,739 B1 | 11/2004 | Campbell et al. |
| 6,895,321 B2 * | 5/2005 | Campbell et al. ............. 701/70 |
| 2002/0005297 A1 | 1/2002 | Alft et al. |
| 2002/0190607 A1 | 12/2002 | Padden et al. |
| 2003/0079543 A1 | 5/2003 | Potter |

* cited by examiner

US 7,296,470 B2

EXTENDED ACCURACY FLEXURED PLATE DUAL CAPACITANCE ACCELEROMETER

CROSS-REFERENCE TO RELATED APPLICATIONS

The present invention is related to application Ser. No. 10/345,529, entitled "Flexure Plate Dual Capacitance Accelerometer," filed on Jan. 23, 2003, and incorporated by reference herein.

TECHNICAL FIELD

The present invention relates generally to accelerometers, and more particularly, to an extended accuracy flexured plate dual capacitance accelerometer.

BACKGROUND ART

It is well known that capacitive accelerometers measure the acceleration, vibration, and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, such as capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in an aerospace system or in a portion of an aircraft or spacecraft navigation or guidance system. Accordingly, the temperature in the operating environment of the accelerometer changes over a wide range. Consequently, acceleration must be measured with a high accuracy over a wide range of temperatures and temperature gradients. This is often a difficult and inefficient process.

The disadvantages associated with current accelerometer systems have made it apparent that a new accelerometer is needed. The new accelerometer should substantially minimize temperature-sensing requirements and should also improve acceleration detection accuracy. The present invention is directed to these ends.

SUMMARY OF THE INVENTION

In accordance with one aspect of the present invention, a flexure plate accelerometer system includes a flexure plate and two fixed plates on either side of the flexure plate. The flexure plate generates a flexure plate signal as a function of reference signals received in the fixed plates. A precision transformer generates the reference signals from a precision sine wave generated by a symbol generator controlled by a microprocessor. The microprocessor controls the symbol generator and activates an analog-to-digital converter in response to a signal coincident with a positive and negative peak of the precision sine wave. The analog-to-digital converter generates a digital word from the flexure plate signal, which is processed further in the microprocessor.

One advantage of the present invention is that it generates a dynamic range and granularity sufficient for Inter-Continental Ballistic Missile (ICBM) usage. Moreover, the flexure plate accelerometer consumes less power than current accelerometers, while dramatically improving reliability.

Another advantage is that it is not substantially affected by changes in temperature or temperature gradients. While the flexure plate configuration reduces the temperature sensitivity, the symbol generator excitation allows narrow band analog filtering. These effects enhance the signal-to-noise ratio.

This new avenue, made possible by emerging conversion technologies, may prove to be a very low cost method of obtaining ICBM quality measurements.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to a flexure plate accelerometer, particularly suited to the aerospace field. The present invention is, however, applicable to various other uses that may require accelerometers, such as any system requiring position and velocity measurements under extreme conditions, as will be understood by one skilled in the art.

Figure 1:
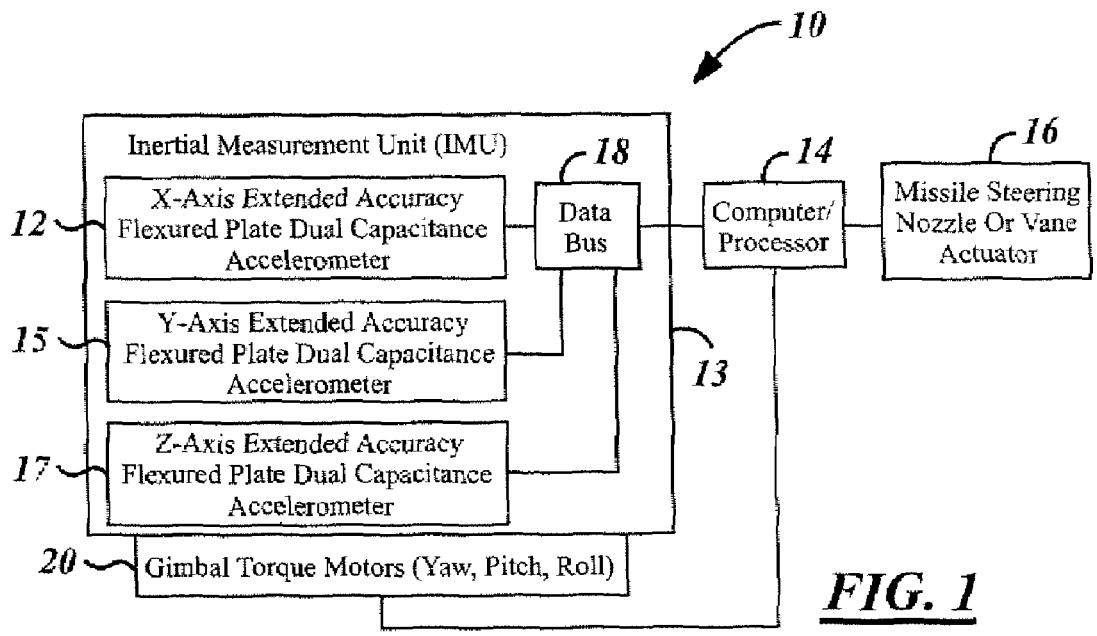
FIG. 1 illustrates an aerospace system including an accelerometer system in accordance with one embodiment of the present invention.
Figure 2:
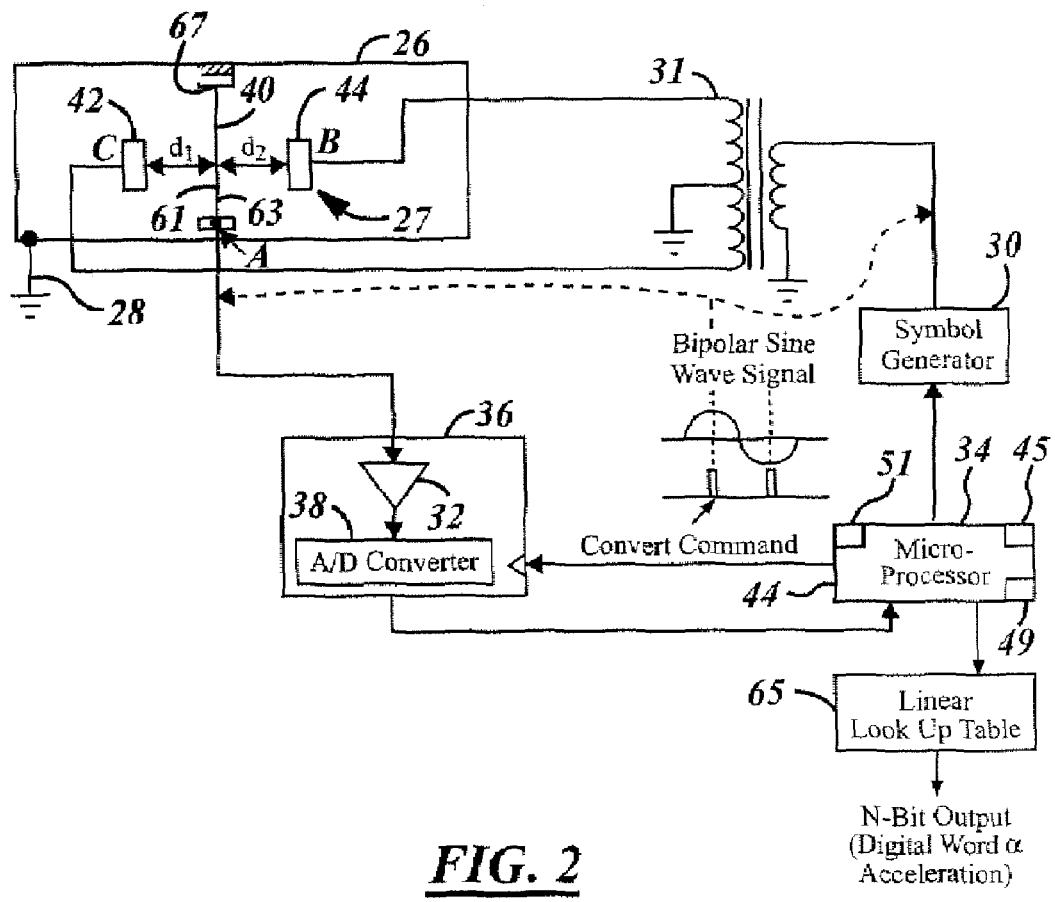
FIG. 2 illustrates an accelerometer system in accordance with FIG. 1.

Referring to FIGS. 1 and 2, the missile or aerospace system 10, including a flexure plate accelerometer 12 within an inertial measurement unit 13, is illustrated. The aerospace system 10 is merely an illustrative example of an accelerating object and not meant to be limiting. For example, the present flexure plate accelerometer 12 could be implemented in any accelerating object to sense acceleration forces, including any type of vehicle or missile system, such as a Minuteman III missile system or a Scud missile system.

The illustrated aerospace system 10 includes an inertial measurement unit 13 including three flexure plate accelerometers 12, 15, 17 and a data bus 18. The three accelerometers, the x-axis accelerometer 12, the y-axis accelerometer 15, and the z-axis accelerometer 17, are coupled to gimbals and gimbal torque motors 20 (yaw, pitch and roll motors). The accelerometers 12, 15, 17 are also coupled to the data bus 18, which transfers information to a computer/processor 14. The computer 14 is coupled to the missile steering nozzle (or vane actuators) unit 16 and the gimbal torque motors 20.

The flexure plate accelerometer 12 or extended accuracy variable capacitance flexure plate accelerometer is a single axis accelerometer generating a robust wide dynamic range of performance. Important to note is that alternate embodiments of the present invention have one or more accelerometers, the three illustrated accelerometers 12, 15, 17 are only one example of a possible arrangement of accelerometers, and any number of accelerometers can be utilized.

The accelerometer 12 will be described as an illustrative example of the three accelerometers 12, 15, 17 in this embodiment. The accelerometer 12 is part of the inertial measurement unit 13 and includes a housing 26 including a flexure plate system 27, a ground 28, a microprocessor 34, a symbol generator 30, a precision transformer 31, an amplifier 32, a heated structure 36, an analog-to-digital converter 38 (A/D converter), and a linear look-up table 65.

In the present embodiment, the housing 26 encloses the flexure plate system 27, which includes a flexure plate 40 and two fixed plates 42, 44. The flexure plate 40 includes a first side 61, a second side 63 and a common edge 67 and is affixed to the housing 26 through at least one edge 67. Numerous other attachment points are, however, included, as will be understood by one skilled in the art.

The flexure plate 40 is positioned between the first and second fixed plates 42, 44 such that the first fixed plate 42 is a first distance ($d_1$) from a first side 61 and the second fixed plate 44 is a second distance ($d_2$) from a second side 63 of the flexure plate 40.

The flexure plate 40 is electrically isolated from the metal housing structure 36 and rigidly fixed thereto through almost any manner known in the art. Resultantly, all the system flexure is generated within the flexure plate 40. This generally increases reliability and robustness of the system 10. This, however, generates a non-linear output from the flexure plate 40, which will be discussed regarding the microprocessor 34.

Figure 3:
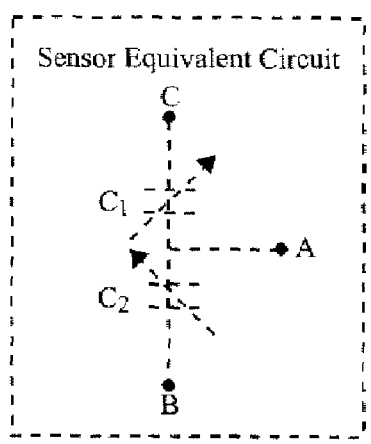
FIG. 3 illustrates the equivalent circuit for the capacitors of FIG. 2.

The combination of the first fixed plate 42 and the flexure plate 40 forms a first parallel plate capacitor, and the combination of the second fixed plate 44 and the flexure plate 40 forms the second parallel plate capacitor. The equivalent capacitor for the first parallel plate capacitor is illustrated in FIG. 3 in broken lines as $C_1$, and the equivalent capacitor for the second parallel plate capacitor is illustrated in broken lines as $C_2$.

The capacitance of the parallel plate capacitors is determined by the following: $C \cong (\epsilon_0 A)/d$ where $\epsilon_0$ is the permittivity constant, A is the area of a fixed plate 42 or 44, and d is the effective distance between the flexure plate 40 and one of the fixed plates 42, 44.

The first fixed plate 42 is coupled to the precision transformer output 31 and positioned a first distance ($d_1$) from the flexure plate 40. The first fixed plate 42 and the flexure plate 40 form a first capacitor whose operation is also governed by the equation $C \cong (\epsilon_0 A)/d$ The second fixed plate 44 is also coupled to the opposite side of the precision transformer 31 and positioned a second distance ($d_2$) from the flexure plate 40. The second fixed plate 44 and the flexure plate 40 form a second capacitor whose operation is governed by the equation $C \cong (\epsilon_0 A)/d$ The distances ($d_1$ and $d_2$) between the flexure plate 40 and the fixed plates 42, 44 change as a function of acceleration and are proportional or equal when the system 10 is at rest.

During acceleration, the flexure plate 40 flexes according to the reaction force of Newton's second law of motion, force=mass×acceleration (F=ma), causing the distance between the flexure plate 40 and the fixed plates 42, 44 to vary, thus creating the two variable capacitors $C_1$, $C_2$, one on each side of the flexure plate 40. The capacitances of $C_1$ and $C_2$ are further generated through the fixed plates 42, 44 receiving signals from the symbol generator 30 through the precision isolation transformer 31.

The symbol generator 30 drives the precision isolation transformer 31 as a function of a precision sine wave commanded through the microprocessor 34. The transformer 31, sending signals to both fixed plates 42, 44, provides a center tapped reference for each of the fixed plates 42, 44, whereby these references are of opposite polarities. The fixed plates 42, 44 thereby receive signals of opposite polarity, and thereby the flexure plate 40 transforms into a voltage divider, which divides the voltage between the fixed plates 42, 44 (C and B) as a function of acceleration. One advantage of the transformer 31 is that it may be used as a smoothing filter for the symbol generator output.

An alternate embodiment operates without the transformer and includes lowering of the signal applied to the A/D converter 38. In this configuration, the symbol generator drives fixed plate 42 or 44 (B or C), and either 42 or 44 (C or B) is then grounded.

The voltage phase of the flexure plate 40 gives direct indication of the direction of acceleration. This output is gain adjusted if required in the amplifier 32. The resulting waveform from the amplifier 32 is then received in the A/D converter 38 where the data becomes a digital word.

The flexure plate 40 is monitored through at least one high accuracy A/D converter 38. The A/D converter 38 converts a peak value of this flexure plate 40 (voltage divider) with a convert command signal generated by the microprocessor 34. This convert signal is coincident with the positive and negative peaks of the sine wave. The resulting digital word from the A/D converter 38 represents the scaled amplitude without any requirement for filtering (as in the analog domain).

The microprocessor 34 receives the digital word from the A/D converter 38. Digital filtering in the microprocessor 34 is applied to rectify the results from the A/D converter 38, to determine polarity of acceleration, and to perform an average of two samples, thereby eliminating any DC offsets. The digital filtering includes the required "n-pole" filtering for reducing the clock jitter and general noise to a required level.

The digital word is then filtered and linearized in the microprocessor 34 or the linear look up table 65 (linearizer) to remove manufacturing and flexure non-uniformities. The filtered and linearized output is a digital word having a magnitude proportional to the acceleration of the system in either direction along the perpendicular axis.

The microprocessor 34, which may be a section of the computer 14 or a standalone processor (ASIC or FPGA), includes a precision clock 45, which drives the symbol generator 30 to generate a precision sine wave at a known phase angle.

The microprocessor 34 also includes a conversion clock 51 commanding the A/D converter 38 and coincident with the positive and negative peak of the precision sine wave. The resulting digital word from the A/D converter 38, as commanded by the microprocessor 34, represents the scaled amplitude of the sine wave without any requirement for filtering, as is generally needed in the analog domain.

In other words, the microprocessor 34 receives the overall digital word signal from the A/D converter 38 and, as mentioned above, compensates it for both nonlinear functions and any manufacturing anomalies. The microprocessor compensation value is established in manufacturing through taking large samples of performance curves in, for example, a digital corrector 49, as will be understood by one skilled in the art. The next step includes co-adding of data received in the microprocessor 34 for further reducing system noise, increasing accuracy, and controlling bandwidth response to a required level.

Data from the microprocessor 34 may be linearized with the linear look-up table 65 for the non-linearities induced by the peculiar mechanical misalignment, manufacturing, and other data path anomalies. The accelerometer output from the linear look-up table 65 is an N-bit digital word having a magnitude proportional to the acceleration of the system 10 in either direction along an axis perpendicular to the flexure plate 40.

This flexure plate configuration reduces system temperature sensitivity and the precision conversion of the symbol generator output removes the requirement for analog processing, thereby allowing greater flexibility in the digital domain. The present circuitry does not require any special development but utilizes newly released commercial off-the-shelf hardware and other previously known hardware. For high-level accuracies, the circuitry may be mounted on the heated structure 36.

Statistical filtering of the linearized data somewhere significantly above the maximum flexure frequency also occurs in either the microprocessor 34 or the computer 14 to reduce the overall noise impact on the system 10. The compensation for the non-linearity of the flexure structure and overall transport error is compensated for by the microprocessor 34 (whose values are established in manufacturing through sampling performance curves as discussed above).

The computer 14 receives the acceleration signal multiplied by the constant and generates a computer signal and response thereto. The computer 14 is embodied as a typical missile or airplane computer, as is familiar in the art.

The missile steering nozzle or vane actuators 16 receive the computer signal and activate the gimbal torque motors 20 or object control devices in response thereto.

Figure 4:
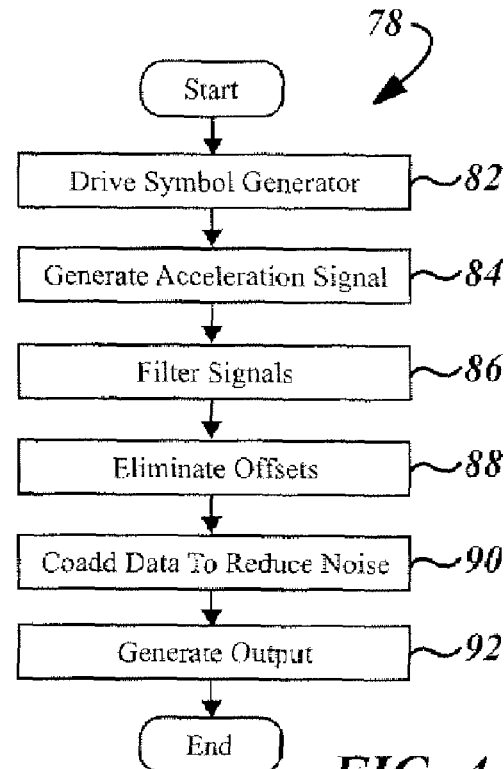
FIG. 4 illustrates a logic flow diagram of accelerometer circuitry in operation.

Referring to FIG. 4, a logic flow diagram 78 of the flexure plate accelerometer control circuitry is illustrated. Logic starts in operation block 80 when the microprocessor precision clock 45 drives the symbol generator 30 to generate a precision sine wave at a known phase angle.

In operation block 82, an acceleration signal is generated from the flexure plate 40 as a function of the precision sine wave transformed in the transformer 31 and received by the fixed plates 42, 44.

In operation block 84, the microprocessor conversion clock 51 for the A/D converter 38 is coincident with the positive and negative peak of the sine wave, and a conversion command signal from the clock 51 activates the analog-to-digital conversion. The resulting digital words represent a scaled amplitude without any requirement for analog filtering.

In operation block 86, digital filtering is applied in the microprocessor 34 rectifying the results and determining polarity of acceleration.

In operation block 88, DC offsets are eliminated through performing an average of two samples. The digital filtering in the microprocessor 34 then provides the required "n-pole" filtering to reduce the clock jitter and general noise to a predetermined level.

In operation block 90, the data is co-added further to reduce the noise, increase accuracy, and control the bandwidth response to the required level. All of these functions were previously shared in hardware design.

In operation block 92, the accelerometer output is generated as an N-bit digital word having a magnitude proportional to the acceleration of the system 10 in either direction along an axis perpendicular to the flexure plate 40.

Figure 5:
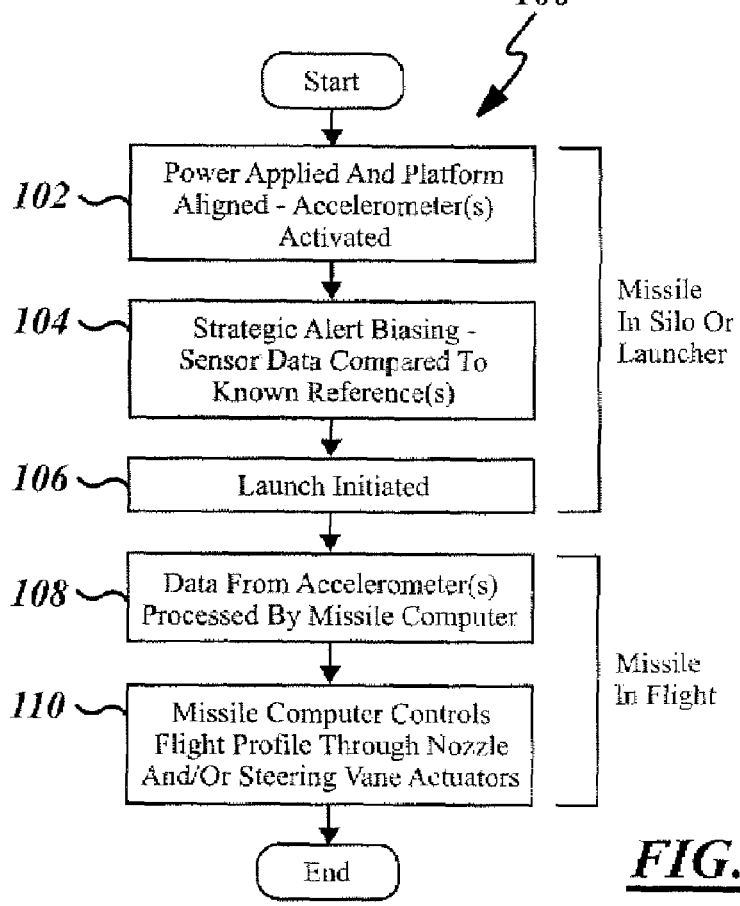
FIG. 5 illustrates a logic flow diagram of the aerospace system of FIG. 1 in operation, in accordance with another embodiment of the present invention.

Referring to FIG. 5, a logic flow diagram 100 illustrating a method for acceleration control is illustrated. Logic starts in operation block 102 where power is applied to the system, the missile platform is aligned and the capacitive accelerometer is activated.

In operation block 104, strategic alert biasing occurs and sensor data is compared to a known reference.

In operation block 106, the missile is launched.

In operation block 108, the missile accelerates and the flexure plate flexes to either increase or decrease $d_1$ or $d_2$, thereby causing the flexure plate voltage on one side to increase while decreasing on the other side. The fixed plates receive signals from the transformer, and the flexure plate acts as a voltage divider for the fixed plates. The voltage signal from the flexure plate is received in the amplifier and gain adjusted. The gain adjusted signal is converted to a digital signal and rectified in the microprocessor. Signals from the microprocessor are linearized through the linear look-up table and an N-bit digital word is generated. Data from the accelerometer(s), i.e. the N-bit digital word, is processed by the missile computer or attitude controller.

In operation block 110, missile systems respond to the acceleration. In other words, the computer receives a signal indicating that acceleration of the system has changed. In response to this change, for example, thrusters are activated to compensate for the acceleration change. In other words, the missile computer/controller/processor controls the flight profile through the missile nozzle or steering vane actuators.

In operation, a method for operating a flexure plate accelerometer system includes accelerating a flexure plate, generating a flexure plate waveform from the flexure plate as a function of a precision sine wave generated at a known phase angle and received in fixed plates (on either side of the flexure plate as discussed above), activating analog-to-digital conversion of the flexure plate waveform in response to a signal coincident with a positive and negative peak of the precision sine wave, and converting the flexure plate waveform signal to a digital word.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. An accelerometer system comprising:
   a housing;
   a flexure plate system enclosed within said housing and comprising a first fixed plate, a second fixed plate spaced apart from and in parallel relation to said first fixed plate, and a flexure plate disposed between and in substantially parallel relation to said first fixed plate and said second fixed plate, wherein all the flexure plate system is generated within said flexure plate, and wherein said first fixed plate and said second fixed plate receive reference signals;
   said flexure plate is rigidly fixed to said housing along at least an edge and electrically isolated from said housing, said flexure plate and the first fixed plate defining a first distance and a first capacitor and said flexure plate and said second fixed plate defining a second distance and a second capacitor, wherein said first and second distances vary in response to acceleration forces acting upon said flexure plate;

a symbol generator generating a precision sine wave at a known phase angle; and a precision transformer receiving said precision sine wave and generating said reference signals therefrom.

2. The system of claim 1 further comprising a precision clock driving said symbol generator.

3. The system of claim 1, wherein said reference signals comprise a first signal having a positive polarity received in said first fixed plate and a second signal having a negative polarity received in said second fixed plate, and wherein said flexure plate divides a voltage between said first fixed plate and said second fixed plate as a function of acceleration and generates therefrom a flexure plate voltage signal.

4. The system of claim 3 further comprising an A/D converter receiving said flexure plate voltage signal and converting said flexure plate voltage signal to a digital word signal.

5. The system of claim 4, further comprising a microprocessor comprising a conversion clock coincident with a positive and negative peak of said precision sine wave and generating a convert signal for controlling said A/D converter.

6. The system of claim 5, wherein said convert signal commands said A/D converter to convert a peak value of said flexure plate voltage signal.

7. The system of claim 5 further comprising an amplifier adjusting an amplitude of said flexure plate voltage signal.

8. The system of claim 6 further comprising a heated structure mounted on said housing, wherein said amplifier is mounted on said heated structure.

9. The system of claim 1 further comprising microprocessor adapted to receive a flexure plate voltage signal and rectify said flexure plate voltage signal as a function of a said precision sine wave thereby generating a rectified waveform.

10. The system of claim 9, wherein said microprocessor further generates n-pole filtering for reducing clock jitter and general noise.

11. The system of claim 9, wherein said microprocessor co-adds data to reduce noise.

12. An accelerometer system comprising:
a housing;
a flexure plate system enclosed within said housing and comprising a first fixed plate, a second fixed plate spaced apart from and in parallel relation to said first fixed plate;
a first flexure plate accelerometer rigidly fixed to said housing and electrically isolated from said housing wherein all the flexure plate system is generated within said first flexure plate accelerometer;
an amplifier adjusting an amplitude of a flexure plate signal from said first flexure plate accelerometer;
an analog-to-digital converter converting said flexure plate signal to a first digital word;
a symbol generator generating a precision sine wave at a known phase angle;
a precision transformer receiving said precision sine wave and generating reference signals therefrom, whereby said flexure plate signal is generated from said first flexure plate accelerometer as a function of said reference signals; and a microprocessor comprising logic for controlling said symbol generator, said microprocessor further comprising logic activating said analog-to-digital converter in response to a signal coincident with a positive and negative peak of said precision sine wave, said microprocessor further comprising logic digitally filtering and rectifying said digital word, said microprocessor linearizing and co-adding said digital word.

13. The system of claim 12, wherein digitally filtering further comprises n-pole filtering.

14. The system of claim 12 further comprising: a second accelerometer and a third accelerometer, wherein said second and third accelerometers are arranged with said first flexure plate accelerometer to receive cross axis thrust data.

15. The system of claim 14 further comprising: a data bus adapted to receive acceleration signals from said first, second and third accelerometers, said data bus further adapted to exchange information with a computer.

16. The system of claim 15, wherein said first accelerometer is coupled to a yaw torque motor, said second accelerometer is coupled to a pitch torque motor, and said third accelerometer is coupled to a roll torque motor.

17. The system of claim 15 further comprising a precision heating device coupled to said housing adapted to reduce temperature gradients in said first flexure plate accelerometer.

18. The system of claim 1 further comprising a computer activating an object control device in response to a first digital word.

19. A method for operating an accelerometer system having a flexure plate system comprising a first fixed plate, a second fixed plate spaced apart from and in parallel relation to the first plate, and a flexure plate disposed between and in substantially parallel relation to the first fixed plate and the second fixed plate wherein said flexure plate is rigidly fixed to a housing and electrically isolated from said housing and wherein all the flexure plate system is generated within said flexure plate, comprising:
accelerating the flexure plate;
generating a precision sine wave at a known phase angle;
generating reference signals as a function of said precision sine wave;
generating a flexure plate waveform from the flexure plate as a function of said reference signals being received by at least one of the first fixed plate and the second fixed plate;
activating analog-to-digital conversion of a flexure plate waveform in response to a signal coincident with a positive and negative peak of said precision sine wave; and converting said flexure plate waveform signal to a digital word.

20. The method of claim 19 further comprising generating said reference signals through transforming said precision sine wave in a transformer.

21. The method of claim 19 further comprising adjusting an amplitude of said flexure plate waveform.

22. The method of claim 19 further comprising linearizing said digital word.

23. The method of claim 19 further comprising digitally filtering said digital word to rectify said digital word.

24. The method of claim 23, wherein digitally filtering further comprises n-pole filtering.

25. The method of claim 23 further comprising a co-adding said digital word.

* * * * *